(12) United States Patent
Lane et al.

(10) Patent No.: US 12,139,296 B2
(45) Date of Patent: Nov. 12, 2024

(54) MULTI-SERVE CONTAINER WITH OVAL CROSS-SECTION

(71) Applicant: AMCOR RIGID PACKAGING USA, LLC, Ann Arbor, MI (US)

(72) Inventors: Michael T. Lane, Brooklyn, MI (US); Bradley S. Philip, Tecumseh, MI (US); James Stelzer, South Lyon, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

(21) Appl. No.: 17/913,805

(22) PCT Filed: Mar. 27, 2020

(86) PCT No.: PCT/US2020/025264
§ 371 (c)(1),
(2) Date: Sep. 22, 2022

(87) PCT Pub. No.: WO2021/194506
PCT Pub. Date: Sep. 30, 2021

(65) Prior Publication Data
US 2024/0208687 A1  Jun. 27, 2024

(51) Int. Cl.
*B65D 1/02* (2006.01)
*B65D 1/44* (2006.01)

(52) U.S. Cl.
CPC ......... *B65D 1/0261* (2013.01); *B65D 1/0207* (2013.01); *B65D 1/44* (2013.01)

(58) Field of Classification Search
CPC ...... B65D 1/0261; B65D 1/0207; B65D 1/44; B65D 79/0084; B65D 79/0081; B65D 1/40; B65D 11/20

USPC ................... 215/382; 220/675, 669
See application file for complete search history.

(56) References Cited

U.S. PATENT DOCUMENTS

| | | | | |
|---|---|---|---|---|
| 5,261,544 | A | * | 11/1993 | Weaver, Jr. .......... B65D 23/102 220/666 |
| D637,494 | S | * | 5/2011 | Coley, Jr. ....................... D9/542 |
| 8,678,215 | B2 | * | 3/2014 | Steiger ................ B65D 47/103 215/382 |
| 2007/0039918 | A1 | * | 2/2007 | Lane .................. B65D 79/0084 215/381 |
| 2007/0045222 | A1 | * | 3/2007 | Denner ................ B65D 1/0223 215/382 |

(Continued)

FOREIGN PATENT DOCUMENTS

| EP | 0395848 A1 | 11/1990 |
|---|---|---|
| EP | 4126682 A1 | 2/2023 |

(Continued)

OTHER PUBLICATIONS

International Search Report and Written Opinion of the ISA issued in PCT/US2020/025264, mailed Dec. 8, 2020; ISA/KR.

(Continued)

*Primary Examiner* — Robert J Hicks
(74) *Attorney, Agent, or Firm* — Harness, Dickey & Pierce, P.L.C.

(57) ABSTRACT

A multi-serve polymeric container having a finish defining an opening of the container, a body, and a base. The body and the base have a substantially oval shape in cross-section, which enables the use of smaller finishes and provides for lighter weight containers.

9 Claims, 10 Drawing Sheets

(56) References Cited

U.S. PATENT DOCUMENTS

| | | | | |
|---|---|---|---|---|
| 2007/0075032 A1* | 4/2007 | Kelley | ............... | B65D 1/44 |
| | | | | 215/381 |
| 2007/0170144 A1* | 7/2007 | Lane | ............... | B65D 1/0223 |
| | | | | 215/383 |
| 2007/0210028 A1* | 9/2007 | Heisner | ............... | B65D 23/102 |
| | | | | 215/384 |
| 2009/0321386 A1* | 12/2009 | Lane | ............... | B65D 23/102 |
| | | | | 215/384 |
| 2010/0326950 A1* | 12/2010 | Lane | ............... | B65D 1/0284 |
| | | | | 215/381 |
| 2010/0326951 A1* | 12/2010 | Coley, Jr. | ............... | B65D 1/0223 |
| | | | | 215/382 |
| 2011/0206882 A1* | 8/2011 | Broyles | ............... | B29C 49/0005 |
| | | | | 264/513 |
| 2012/0000921 A1* | 1/2012 | Mast | ............... | B65D 1/0223 |
| | | | | 220/608 |
| 2012/0103929 A1* | 5/2012 | Fontana | ............... | B65D 1/0223 |
| | | | | 264/249 |
| 2012/0205342 A1* | 8/2012 | Philip | ............... | B65D 1/42 |
| | | | | 215/382 |
| 2012/0298541 A1* | 11/2012 | Hunter | ............... | B65D 1/44 |
| | | | | 206/459.5 |
| 2014/0197127 A1* | 7/2014 | Lane | ............... | B29C 49/541 |
| | | | | 425/526 |
| 2014/0263162 A1* | 9/2014 | Napoli | ............... | B65D 23/102 |
| | | | | 215/382 |
| 2014/0346717 A1* | 11/2014 | Komiya | ............... | B29C 49/4242 |
| | | | | 428/35.7 |
| 2015/0129537 A1* | 5/2015 | Mast | ............... | B65D 1/0223 |
| | | | | 215/382 |
| 2016/0251104 A1* | 9/2016 | Zweifel | ............... | B67C 3/286 |
| | | | | 215/40 |
| 2017/0015466 A1* | 1/2017 | Yourist | ............... | B65D 23/102 |
| 2018/0200931 A1* | 7/2018 | Robbrecht | ............... | B29C 45/30 |
| 2018/0229881 A1* | 8/2018 | Jarman | ............... | B65D 1/0246 |
| 2018/0354167 A1* | 12/2018 | Robbrecht | ............... | B29C 48/022 |
| 2019/0193890 A1* | 6/2019 | Palmer | ............... | B65D 47/122 |
| 2020/0231335 A1* | 7/2020 | Manderfield | ............... | B65D 1/0261 |
| 2021/0214116 A1* | 7/2021 | Palmer | ............... | B65D 1/023 |
| 2024/0092551 A1* | 3/2024 | Siciliano | ............... | B65D 1/0207 |

FOREIGN PATENT DOCUMENTS

| | | | |
|---|---|---|---|
| JP | 2007-297061 A | | 11/2007 |
| JP | 2013133114 A | * | 7/2013 |
| WO | 202194506 A1 | | 5/2021 |

OTHER PUBLICATIONS

Supplementary European Search Report issued in corresponding European Patent Application 20927255.8 dated Dec. 1, 2023.
Canadian Office Action regarding Patent Application No. 3176292, dated Jan. 16, 2024.
Brazilian Office Action regarding Patent Application No. 112022019058-1, dated Nov. 14, 2023.

* cited by examiner

MULTI-SERVE CONTAINER WITH OVAL CROSS-SECTION

CROSS-REFERENCE TO RELATED APPLICATIONS

This application is a U.S. National Phase Application under 35 U.S.C. 371 of International Application No. PCT/US2020/025264, filed on Mar. 27, 2020. The entire disclosure of the above application is incorporated herein by reference.

FIELD

The present disclosure relates to multi-serve container having an oval cross-section.

BACKGROUND

This section provides background information related to the present disclosure, which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; pa is the density of pure amorphous PET material (1.333 g/cc); and pc is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Existing multi-serve containers have a volume between 59 oz to 96 oz, and a rectangular cross-section. This rectangular cross-section can be a limitation in the blow molding process because the corner of the rectangular cross-section is the furthest point away from the longitudinal axis of the preform. When a preform is blow molded into a multi-serve container it must be stretched radially as it is formed into the final container shape of the blow mold. There is a physical limit on how far the PET material will stretch, and because of this the preform body diameter must be large enough so that the PET material can be stretched to the far corners of the container shape without failure. Furthermore, the diameter of the preform body dictates the minimum diameter of the preform/container thread finish. The thread finish can't be smaller than the preform body due to the injection molding process of the preform. For example, the core of the preform mold requires a positive draft angle so that it can be removed from the preform after injection molding. Previous rectangular multi-serve containers typically required at least a 43 mm diameter thread finish.

SUMMARY

This section provides a general summary of the disclosure, and is not a comprehensive disclosure of its full scope or all of its features.

The present disclosure includes a multi-serve polymeric container having a finish defining an opening of the container, a body, and a base. The body and the base have an oval shape in cross-section.

The present disclosure also includes a multi-serve polymeric container having a finish defining an opening of the container. The finish has a diameter of 38 mm or less. The container further includes a body and a base. The container is formed from a preform by two-step blow molding. The container has a volume capacity of 59 oz-96 oz. The body and the base have an oval shape in cross-section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
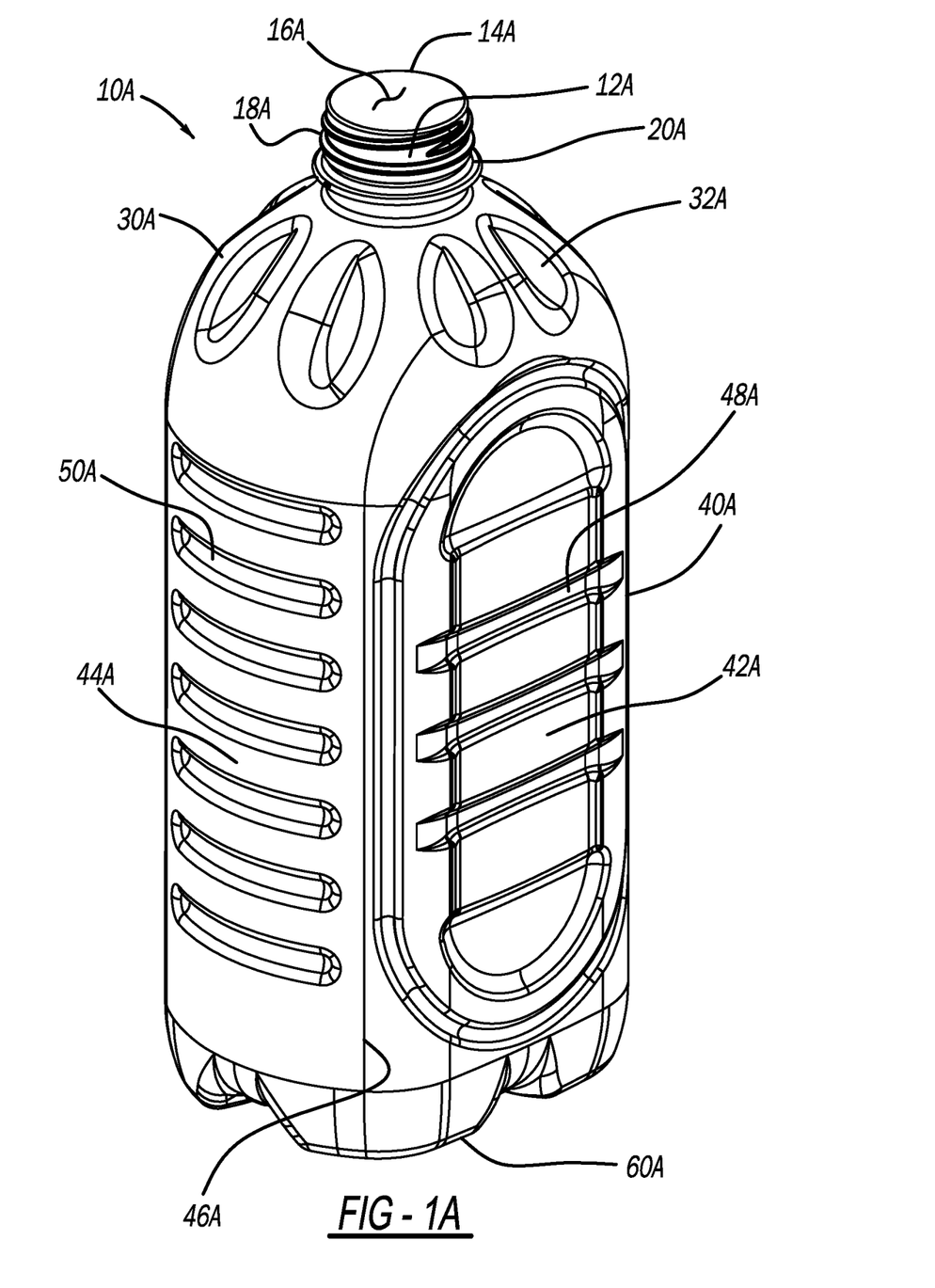
FIG. 1A is a perspective view of a polymeric container in accordance with the present disclosure.
Figure 1B:
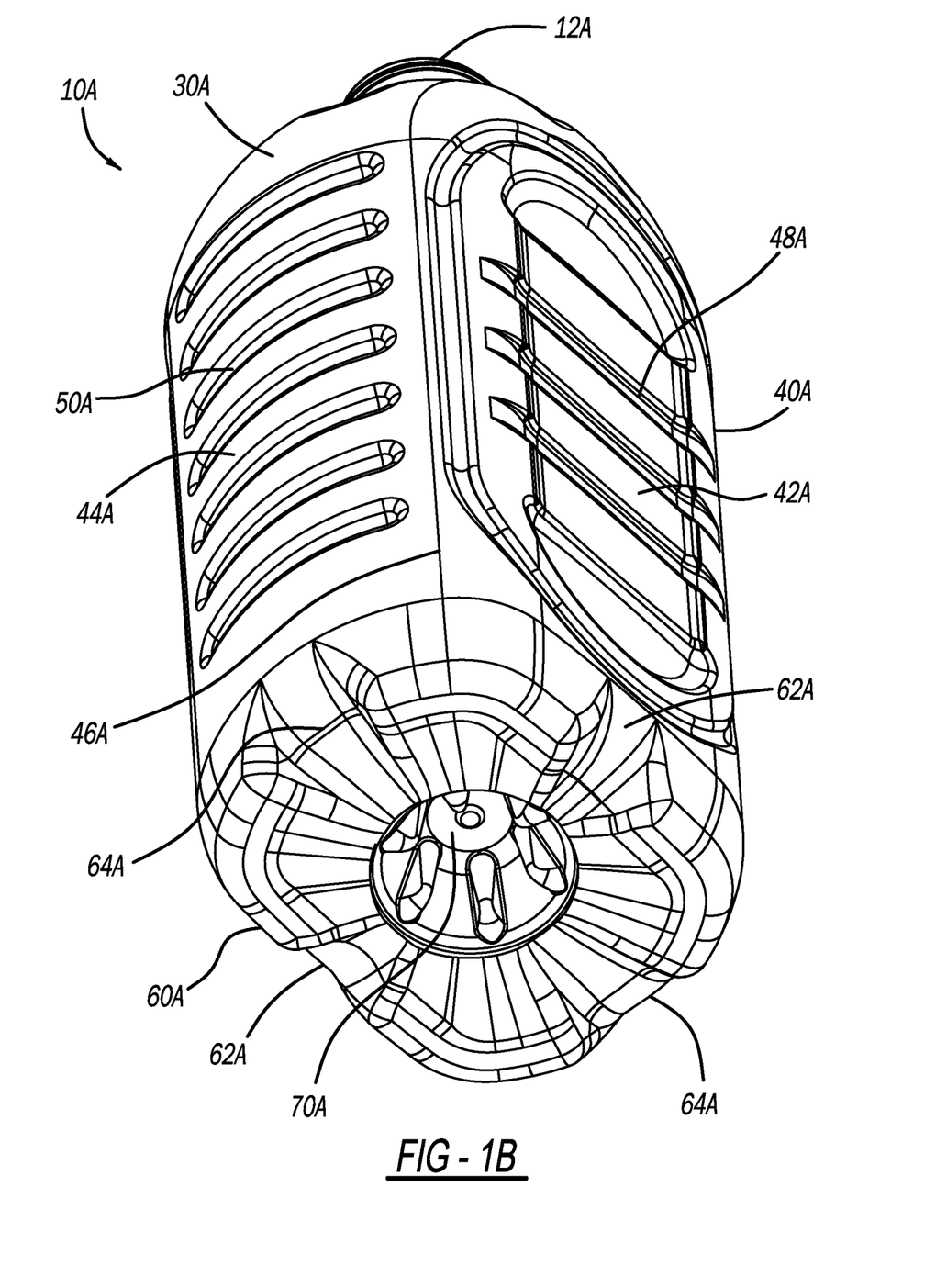
FIG. 1B is another perspective view of the container of FIG. 1A.

With initial reference to FIGS. 1A and 1B, a container in accordance with the present disclosure is illustrated at reference numeral 10A. The container 10A may be formed in any suitable manner, such as from a preform by any suitable two-step blow molding process. FIG. 5 illustrates an exemplary preform at 210. The container 10A may be made of any suitable material, such as, but not limited to the following: polyethylene terephthalate, low-density polyethylene, high-density polyethylene, polypropylene, and polystyrene, for example. The container 10A is advantageously a multi-serve container. Thus, after the container 10A is filled with any suitable product and the product has been emptied from the container 10A, the container 10A may be filled again with additional product.

The container 10A is configured to be hot-filled with any suitable product, such as, but not limited to, the following: water, sports drink, energy drink, juice, alcoholic beverage, foodstuff, etc. Hot-filling advantageously sterilizes the internal product and ensures freshness. Hot-filling requires heating the product to temperatures from 180° F. to 205° F. prior to filling the container. After filling, the container is capped to integrally seal the container with a closure. After sealing, the container begins to cool to ambient temperature, resulting in an internal vacuum within the container at an ambient external temperature and pressure.

The container 10A includes a finish 12A. The finish 12A has an annular rim 14A, which defines an opening of the container 10A. At an outer surface of the finish 12A are threads 18A. The threads 18A are configured to cooperate with any suitable closure for fastening the closure to the finish 12A to close the opening 16A. Extending from the finish 12A beneath the threads 18A is a flange 20A. The flange 20A is suitable for supporting a preform of the container 10A, such as the preform 210 of FIG. 5, during a blow molding process for forming the container 10A.

Extending from the finish 12A is a shoulder 30A of the container 10A. The shoulder 30A may include one or more ribs 32A configured to absorb any vacuum created in the container 10A. The shoulder 30A extends outward from the finish 12A and downward to a body 40A of the container 10A.

The body 40A includes a pair of opposing front and rear surfaces 42A, and a pair of opposing side surfaces 44A. The front and rear surfaces 42A may include ribs 48A. The side surfaces 44A may include ribs 50A. The ribs 48A, 50A may be arranged and shaped in any manner suitable to absorb a vacuum within the container 10A. Connecting the front and rear surfaces 42A to the side surfaces 44A are corners 66A. The corners 66A are generally rounded. The front and rear surfaces 42A are longer than the side surfaces 44A, and thus the container 10A (including the body 40A thereof) has a generally oval shape in cross section. The front and rear surfaces 42A are opposing, substantially flat surfaces. The side surfaces 44A are opposing, curved sides. Each one of the corners 66A is between one of the front and rear surfaces 42A and one of the two side surfaces 44A.

The body 40A extends downward and away from the shoulder 30A to a base 60A of the container 10A. The base 60A is configured to support the container 10A upright when seated on a generally planar surface. With additional reference to FIGS. 1C and 1D, the base 60A will now be described in detail. The base 60A includes a pair of base front and rear surfaces 62A, which are opposite to, and extend generally parallel to, one another. The base 60A also includes a pair of base side surfaces 64A, which are opposite to, and extend generally parallel to, one another. The base 60A further includes four rounded corners 66A. Each one of the corners 66A connects one of the base front or rear surfaces 62A to one of the base side surfaces 64A. The base front and rear surfaces 62A are each longer than the base side surfaces 64A. The corners 66A are rounded to provide the base 60A with an oval shape, whether viewed in cross-section or viewing the exterior of the base 60A as illustrated in FIG. 1C.

Figure 1C:
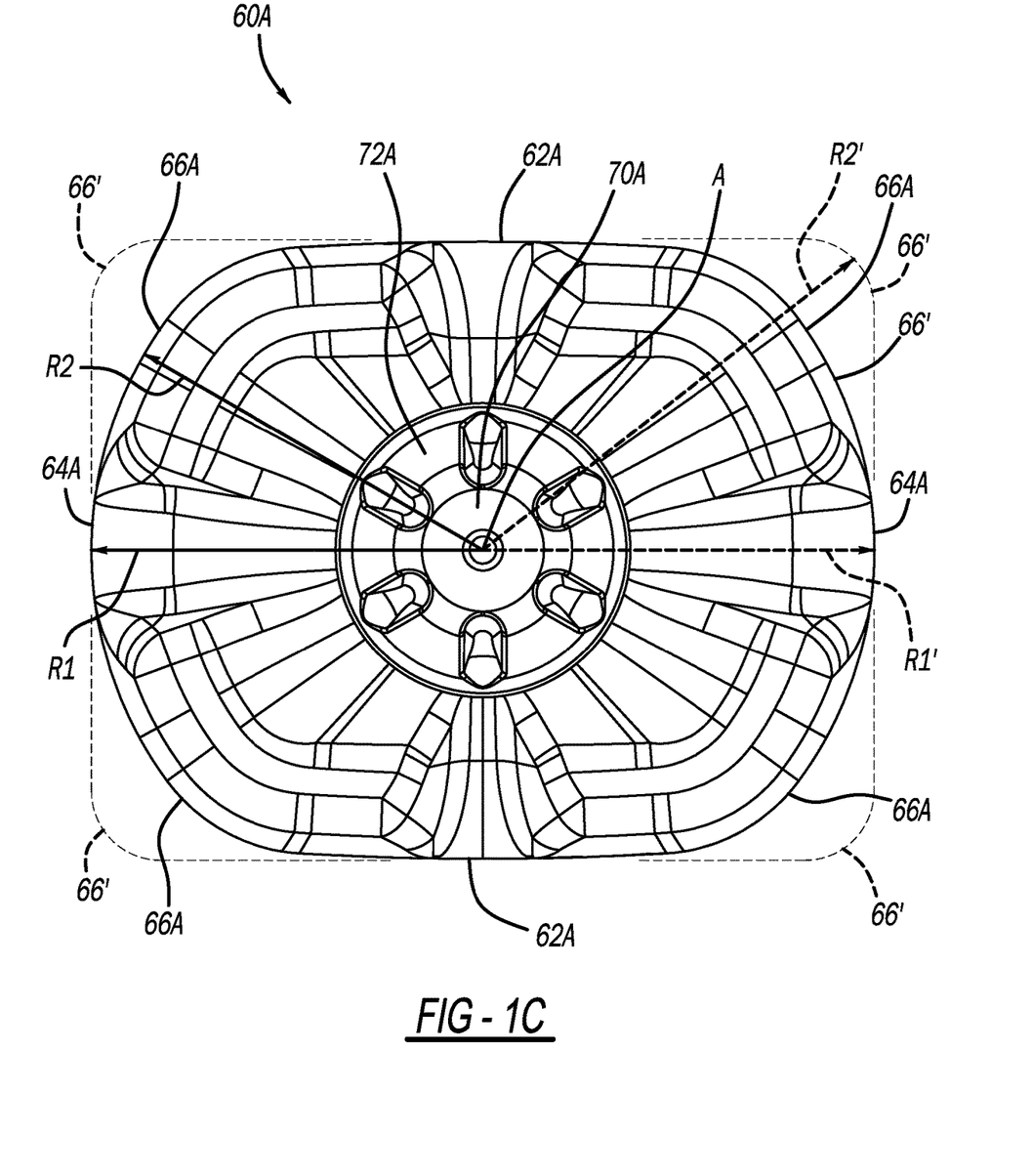
FIG. 1C is a plan view of a base of the container of FIG. 1A.
Figure 1D:
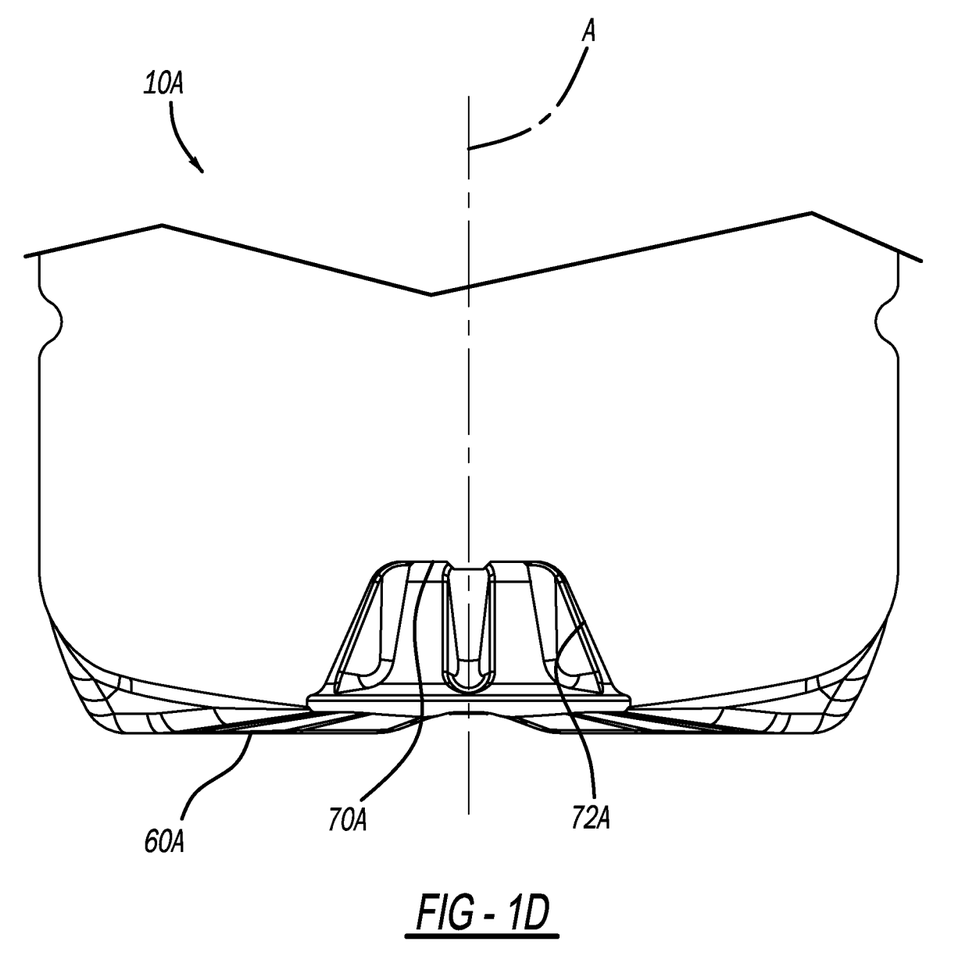
FIG. 1D is a cross-sectional view of the base of the container of FIG. 1A.
Figure 2A:
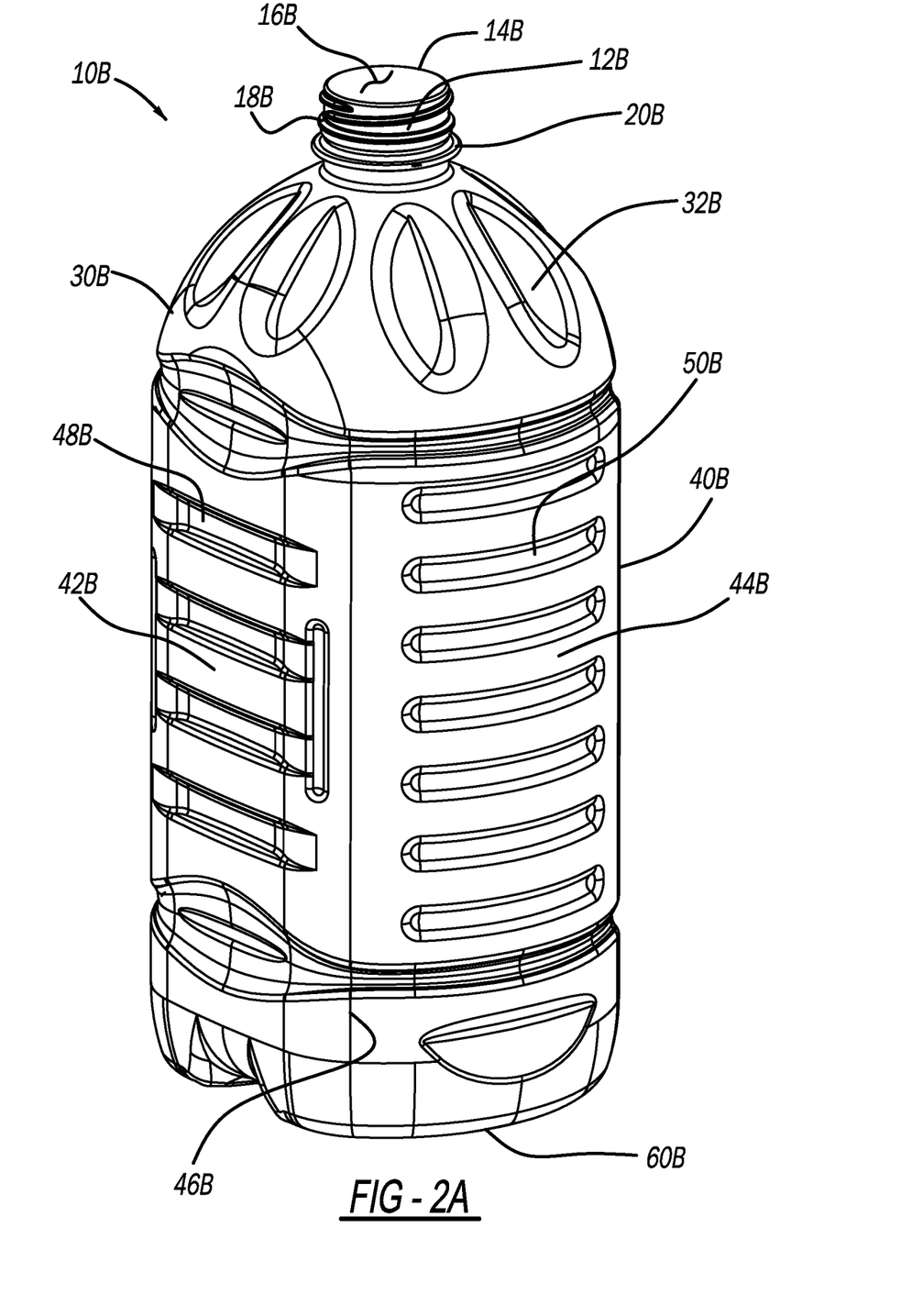
FIG. 2A is a perspective view of yet another polymeric container in accordance with the present disclosure.
Figure 2B:
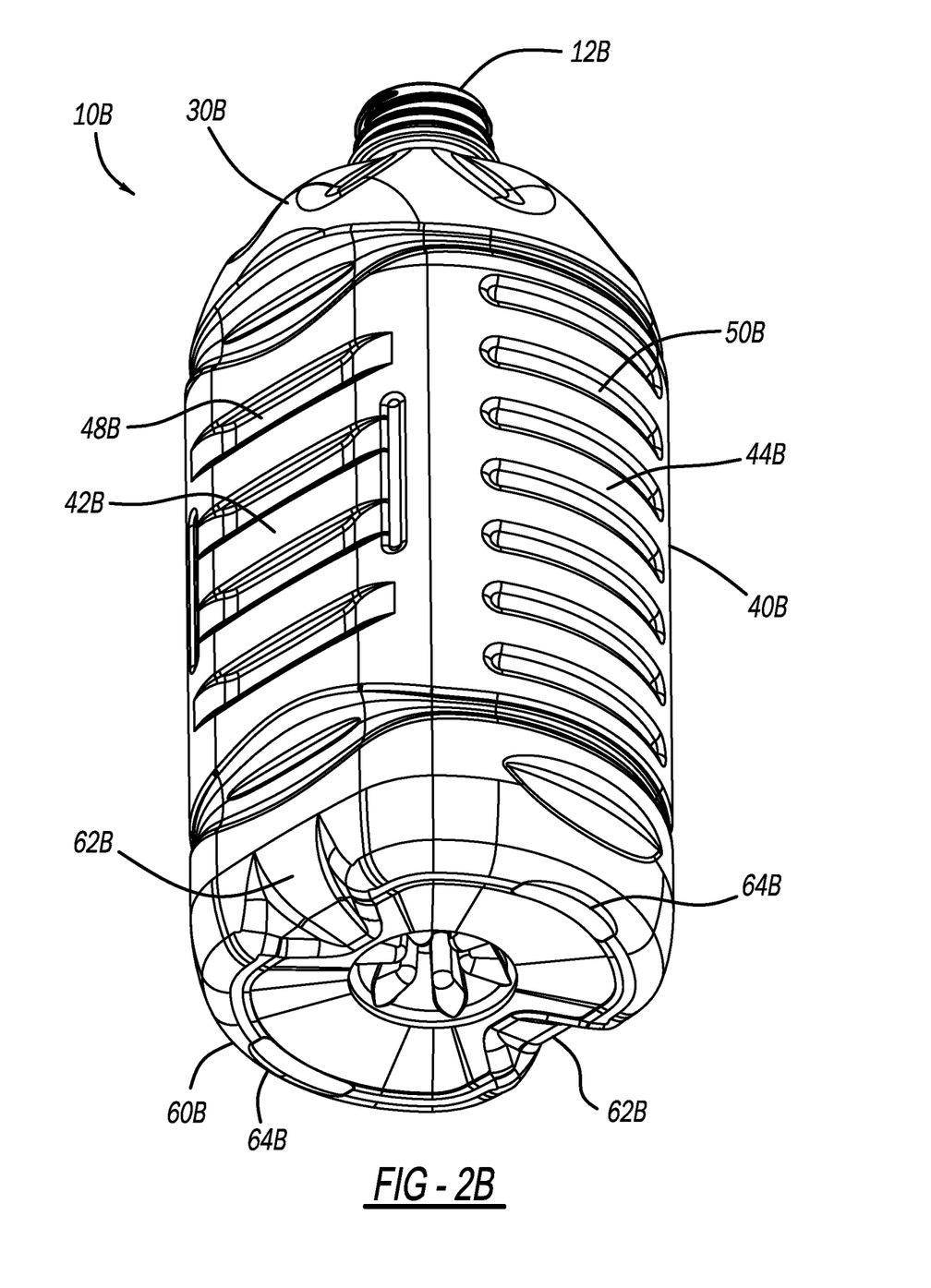
FIG. 2B is a perspective view of the container of FIG. 2A.
Figure 2C:
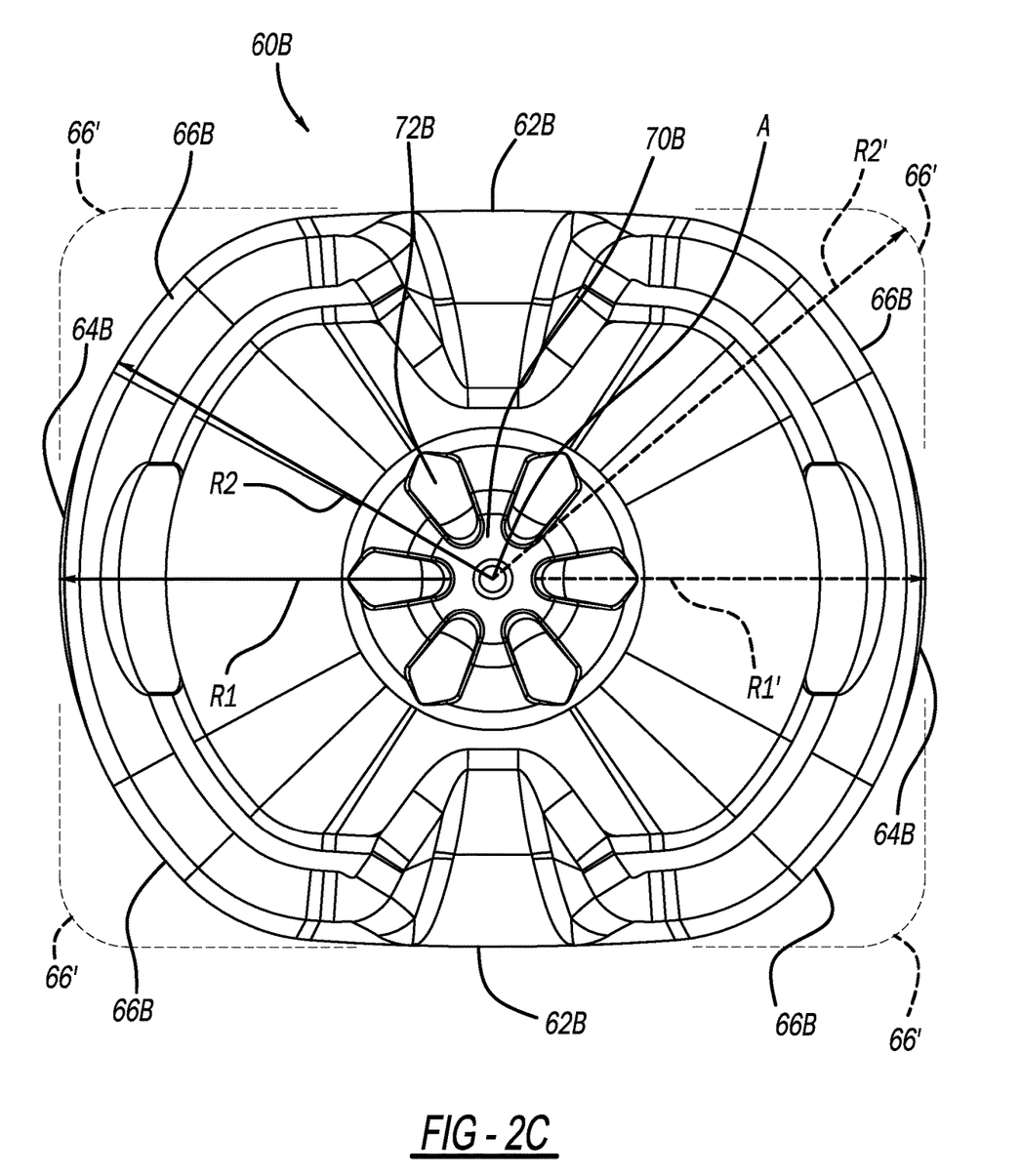
FIG. 2C is a plan view of a base of the container of FIG. 2A.
Figure 2D:
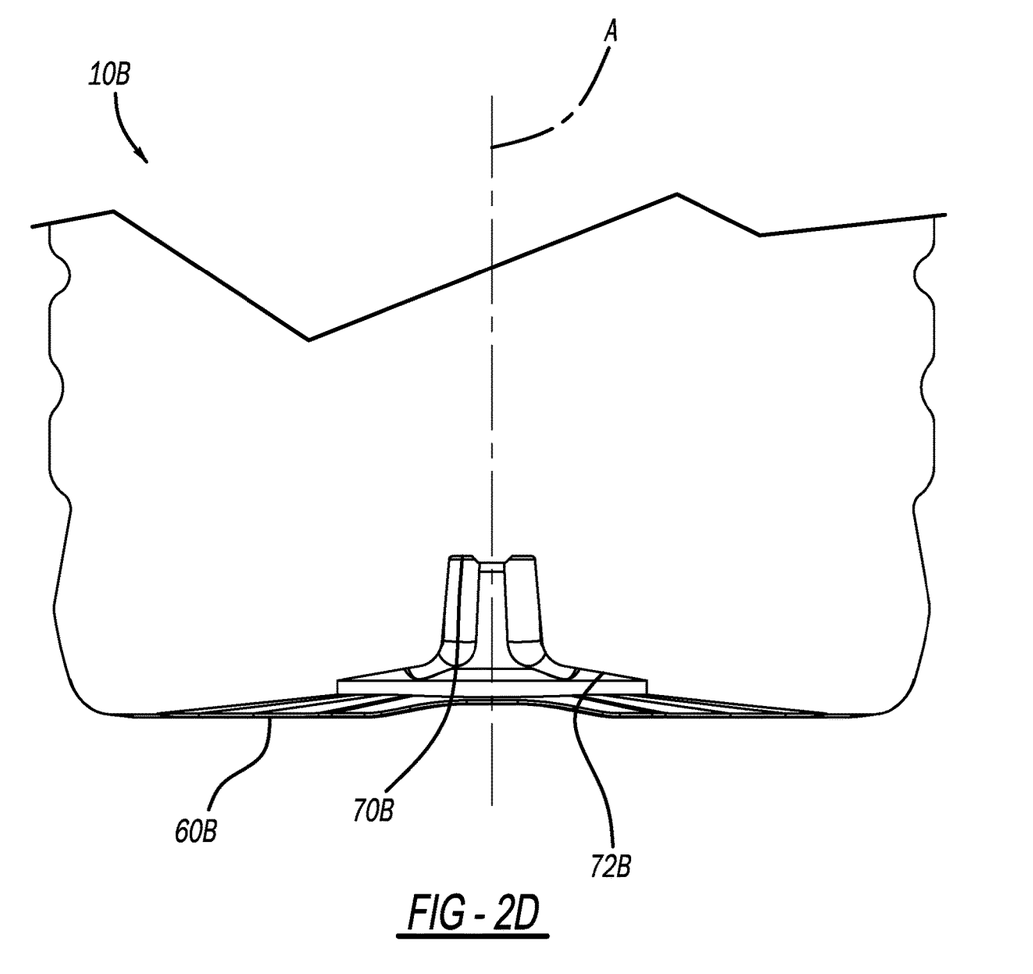
FIG. 2D is a cross-sectional view of the base of the container of FIG. 2A.

With continued reference to FIGS. 1A-1C and additional reference to FIG. 1D, the base 60A includes a center portion 70A. A longitudinal axis A extends through the center portion 70A and through a center of the container 10A up through a radial center of the finish 12A. Extending outward from the center portion 70A is a diaphragm 72A. The diaphragm 72A may be a flexible surface of the base 60A, which allows the base 60A to absorb vacuum forces within the container 10A.

With particular reference to FIG. 1C, the container 10A includes a first radius R1 extending from a center of the base 60A through which the longitudinal axis A extends, to an outermost portion of the base side surface 64A. A second radius R2 extends from the center of the base 60A to the corner 66A. Because the base 60A is oval shaped, the length of radius R1 is the same as radius R2. This oval shape of the base 60A is in contrast to the rectangular shape of previous multi-serve, hot-fill containers, which have a rectangular base. Exemplary corners 66' of such prior rectangular bases are illustrated in FIG. 1C in phantom. Prior art bases have a radius R2' extending to the rectangular corner 66' from a center of the base. Due to the rectangular shape of prior art bases, the prior art radius R2' is longer than a prior art radius R1' extending from the center of the base to a side end surface of the prior art container. Prior art radius R1' is the same as, or substantially the same as, radius R1, and thus prior art radius R2' is longer than radius R2.

The container 10A may be formed of any suitable size to provide any suitable interior volume capacity, such as 59 oz.-96 oz. The finish 12A may have a diameter of 38 mm or less. The container 10A advantageously has a material weight to fill volume of less than 0.9 g/oz. The container 10A has a maximum cross-sectional width that is 15%-30% greater than a maximum cross-sectional depth. In other words, a maximum distance between the side surfaces 44A is 15%-30% greater than a maximum distance between the front and rear surfaces 42A. The maximum cross-sectional width of the container 10A is equal to a maximum distance between opposing corners 46A. Advantageously, the container 10A has a maximum width that is reduced by about 8% as compared to the prior art. The container 10A also has hoop stretch ratio that is reduced by about 8% as compared to the prior art. When the container 10A is formed to have an interior volume of 69 oz. or 64 oz., the finish 12A may be provided with a diameter of 33 mm. Furthermore, when the container 10A is provided with a volume capacity of 96 oz., a maximum diameter of the finish 12A may be 38 mm. Listed below are exemplary parameters of two containers in accordance with the present disclosure, such as the container 10A or 10B for example:

|  | First Container | Second Container |
| --- | --- | --- |
| Finish Size | 33 mm | 38 mm |
| Container Volume | 59 oz | 96 oz |
| Height (mm) | 248 | 272 |
| Width (mm) | 115 | 132 |
| Depth (mm) | 91 | 112 |
| Corner to Corner Width (mm) | 115 | 132 |
| Avg. Wall Thickness | 0.013" | 0.016" |
| Gram Weight | 52 g | 85 g |

FIGS. 2A, 2B, 2C and 2D illustrate yet another exemplary polymeric container in accordance with the present disclosure at reference numeral 10B. The container 10B has an oval-shaped cross-section. The container 10B is substantially similar to the container 10A, and thus the common features are identified in the figures using the same reference numerals used for container 10A, but with the suffix "B." Thus, the description of the container 10A also applies to container 10B. The dimensions and advantages over the art set forth throughout the present disclosure with respect to the container 10A also apply to the container 10B.

Figure 3:
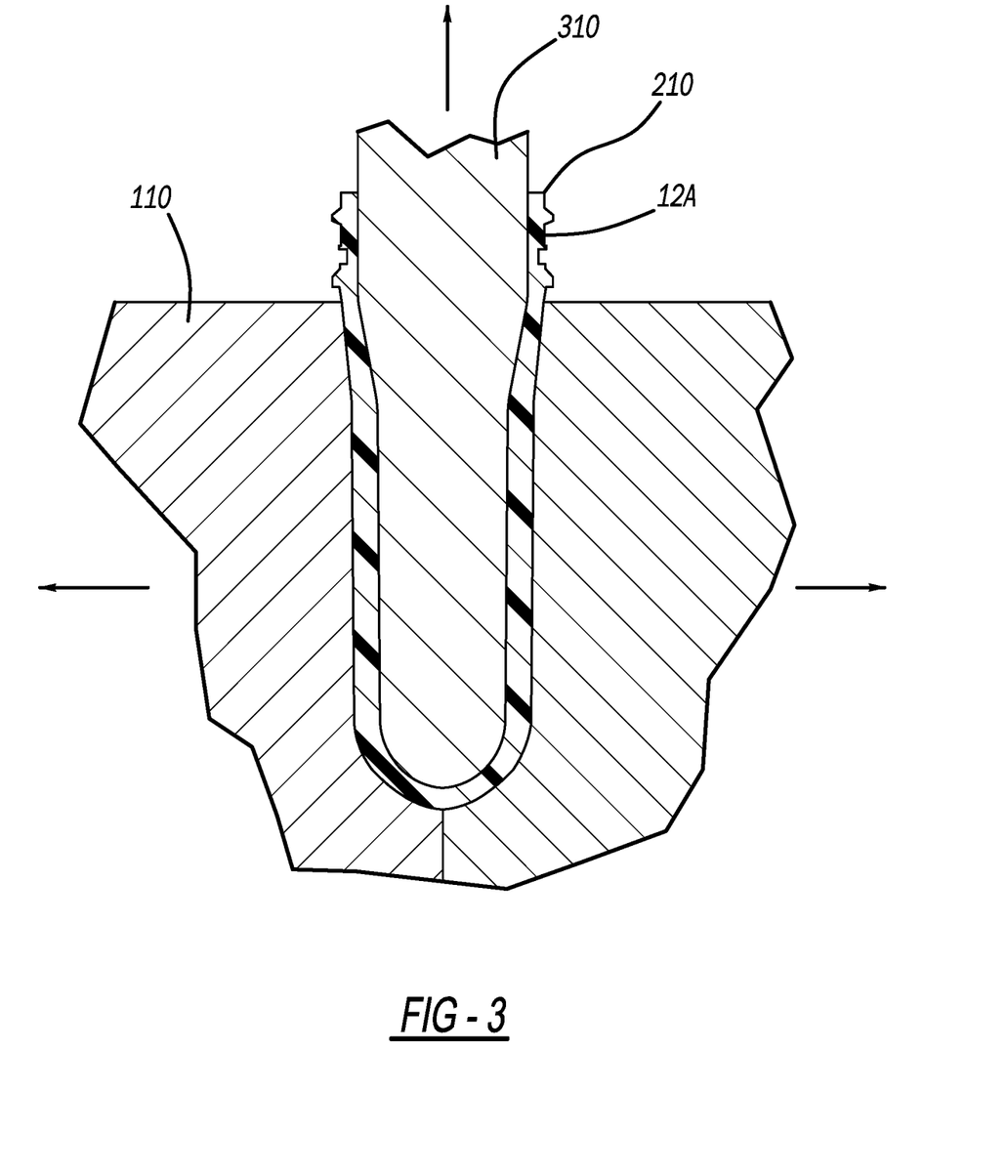
FIG. 3 is a cross-sectional view of a preform mold with a preform therein for forming any one of the containers in accordance with the present disclosure.

FIG. 3 illustrates an exemplary preform mold 110 for forming a suitable preform 210. The preform 210 may be configured to form any one of the containers 10A and 10B by any suitable two-step blow molding process. The preform 210 is formed by inserting a preform core 310 within the mold 110, and then injecting any suitable polymeric material, such as polyethylene terephthalate for example, between the preform core and the mold 110. FIG. 3 illustrates the preform 210 as including the finish 12A of container 10A, but the preform 210 may include any other suitable finish as well, such as the finish 12B.

Figure 4:
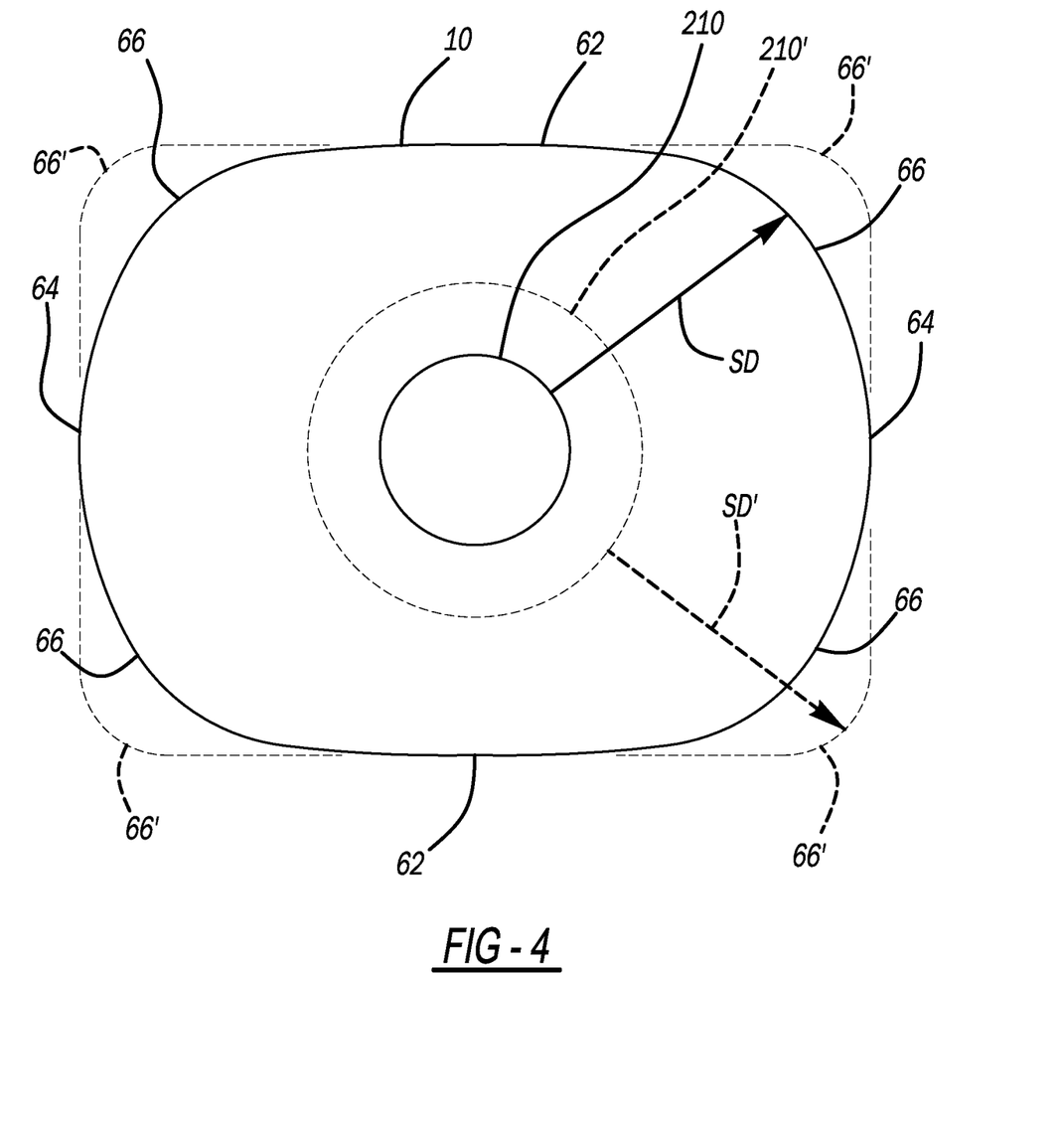
FIG. 4 is a comparison of the preform of FIG. 3 and a prior art preform, as well as a comparison between an oval base of the present disclosure and a prior art rectangular base.

With additional reference to FIG. 4, the preform 210 has a diameter that is smaller than prior art preforms 210' configured to form containers having a rectangular cross-section. Because the preform 210 is relatively smaller than prior art preforms 210', less material is required to form the preform 210 and the resulting container 10A, 10B and the resulting container is lighter.

The present disclosure thus advantageously provides for lightweight polymeric multi-serve hot-filled polymeric containers 10A and 10B having oval cross-sections at bodies 40A, 40B and oval bases 60A, 60B. For each one of the containers 10A, 10B a point furthest from the longitudinal axis A is at the widest point of the containers. An advantage of this design is a reduction in radial preform hoop stretch, which allows for a smaller diameter preform body, such as of the preform 210. Since the preform body is smaller, a smaller diameter of the finishes 12A, 12B is enabled. The smaller preform body diameter and smaller finish size leads to an overall reduction in container material weight and average material thickness. The total surface area of the containers 10A, 10B is also reduced. As a result, the containers 10A, 10B advantageously each have a polyethylene terephthalate material weight to fill volume of less than, or equal to, 0.9 g/oz. FIG. 4 illustrates that a stretch distance SD of the preform 210 in accordance with the present disclosure to the corner 66 is the same as, or substantially similar to, a stretch distance SD' of prior art preform 210' to a rectangular corner 66' of a prior art container.

An additional advantage of the oval cross-section of the containers 10A, 10B is the ability to use either a wrap label or a spot label without changing the design of the container. Previous multi-serve containers were only able to accept one style of labeling.

Another advantage of the oval cross-section of the containers 10A, 10B is the ability of the containers to orient themselves during the conveying process of a filling line operation when the containers are being funneled from a group that is more than one container wide into a single file line of containers. This orientation typically occurs after depalletizing, when the containers are entering into the filling equipment, and also when the containers are exiting a cooling operation and entering a labeling operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A multi-serve polymeric container comprising:
a finish defining an opening of the container;
a body; and
a base;
wherein:
the body includes two opposing substantially flat sides and two opposing curved sides, a maximum cross-sectional width of the body is defined between the two opposing curved sides;
the multi-serve polymeric container has a material weight to fill volume of less than 0.9 g/oz;
the finish has a maximum diameter of 33 mm and the multi-serve polymeric container has a maximum volume capacity of about 64 oz or less;
the body further includes four curved corners, each one of the four curved corners is between one of the two opposing substantially flat sides and one of the two opposing curved sides; and
a first distance between a center of the body and one of the four curved corners of the body is less than, or equal to, a second distance between the center of the body and an end of the body.

2. The multi-serve polymeric container of claim 1, wherein the two opposing substantially flat sides and the two opposing curved sides form an oval shape in cross-section.

3. The multi-serve polymeric container of claim 1, wherein the multi-serve polymeric container is formed by a two-step blow molding process.

4. The multi-serve polymeric container of claim 1, wherein the multi-serve polymeric container has a maximum capacity of 59 oz-96 oz.

5. The multi-serve polymeric container of claim 1, wherein the multi-serve polymeric container has a maximum cross-sectional width that is 15%-30% greater than a maximum cross-sectional depth.

6. A multi-serve polymeric container comprising:
a finish defining an opening of the container, the finish has a diameter of 38 mm or less;
a body; and
a base;
wherein:
the container is formed from a preform by two-step blow molding;
the container has a volume capacity of 96 oz; and
the body and the base have an oval shape in cross-section;
the multi-serve polymeric container has a material weight to fill volume of less than 0.9 g/oz;
the body further includes four curved corners, each one of the four curved corners is between one of two opposing substantially flat sides and one of two opposing curved sides; and
a first distance between a center of the body and one of the four curved corners of the body is less than, or equal to, a second distance between the center of the body and an end of the body.

7. The multi-serve polymeric container of claim 6, wherein the multi-serve polymeric container has a maximum cross-sectional width that is 15%-30% greater than a maximum cross-sectional depth.

8. The multi-serve polymeric container of claim 7, wherein the maximum cross-sectional width is measured between two opposite ones of the four curved corners of the base or the body.

9. The multi-serve polymeric container of claim 7, wherein the maximum cross-sectional width is measured between two opposite sides of the base or the body.

* * * * *

UNITED STATES PATENT AND TRADEMARK OFFICE
CERTIFICATE OF CORRECTION

PATENT NO. : 12,139,296 B2
APPLICATION NO. : 17/913805
DATED : November 12, 2024
INVENTOR(S) : Michael T. Lane et al.

Page 1 of 1

It is certified that error appears in the above-identified patent and that said Letters Patent is hereby corrected as shown below:

On the Title Page

Item (56), please insert the following references:

--US Patent Documents:
| | | |
|---|---|---|
| US-4,076,063 | 02-28-1978 | Cammarata, III et al. |
| US-4,724,116 | 02-09-1988 | Aoki, Katashi |
| US-8,784,957 | 07-22-2014 | Komiya et al. |

Foreign Patent Documents:
| | | |
|---|---|---|
| EP-1457301-B1 | 11-28-2007 | Bekuplast GmbH |
| CN-108860948-A | 11-23-2018 | Jiangsu Yuanzhu Plastic Ind Co Ltd |
| JP-7033132-B2 | 03-09-2022 | Qual Comm Inc |
| CO-92359407 | | IberPlast S.A. |
| CO-94038424 | | Rhodia-Ster Fipack S.A. |

Non Patent Literature Documents/Other Publications:
Columbia Office Action from counterpart CONC20220013830, dated August 20, 2024.--

Signed and Sealed this
Twenty-third Day of December, 2025

John A. Squires
*Director of the United States Patent and Trademark Office*